United States Patent Office 3,463,608
Patented Aug. 26, 1969

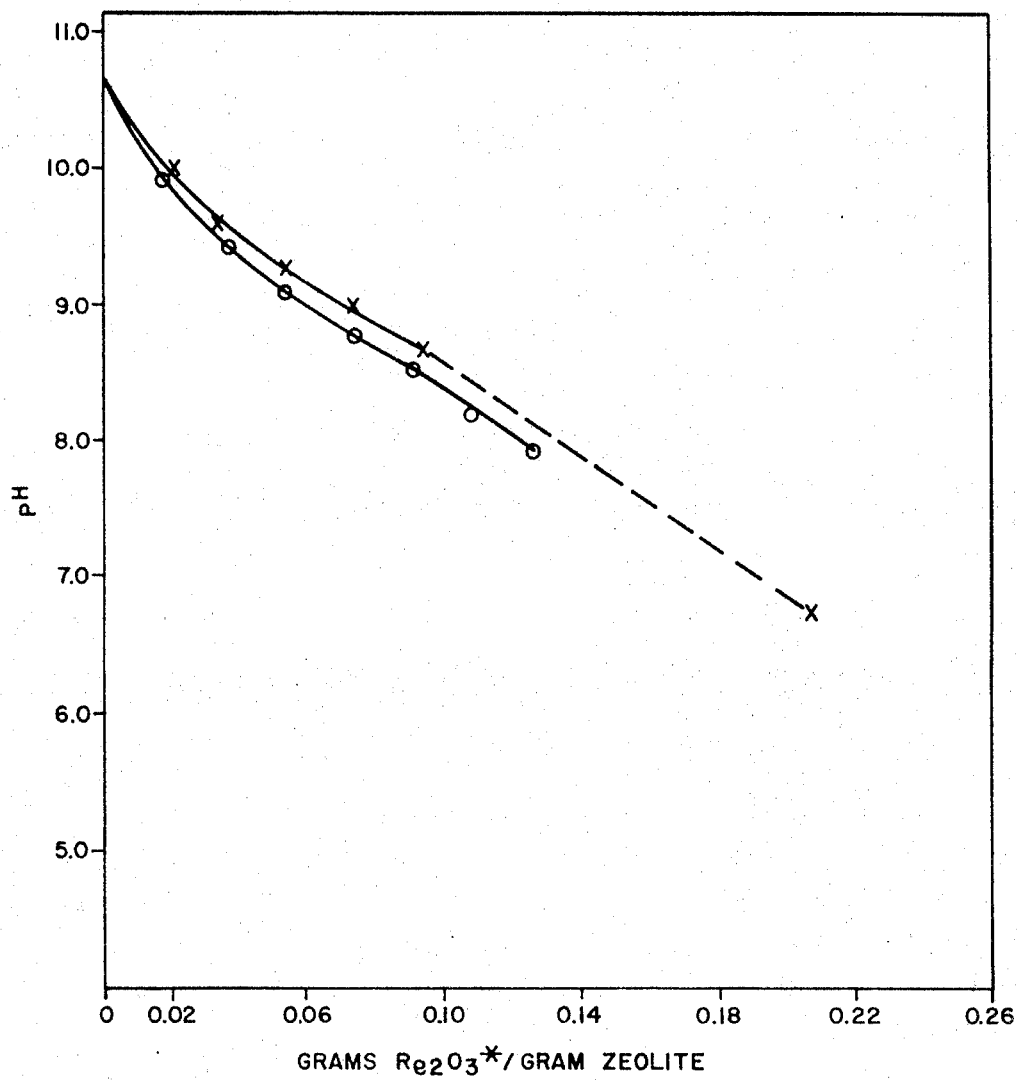

3,463,608
PROCESS FOR THE PURIFICATION OF
MOLECULAR SIEVES
Curtis H. Elliott, Jr., Baltimore, Md., assignor to W. R.
Grace & Co., New York, N.Y., a corporation of
Connecticut
Filed Aug. 18, 1967, Ser. No. 661,717
Int. Cl. C01b 33/28
U.S. Cl. 23—112                                          7 Claims

ABSTRACT OF THE DISCLOSURE

A process for removing excess cation exchange compounds which are deposited upon molecular sieves during the cation exchange treatment of such sieves. The process is characterized by a post calcination washing treatment with a pH controlled wash solution such that pH is maintained within the range of from 3.5 to 5.5.

---

This invention relates to cation exchanged aluminosilicate zeolites and in particular it relates to a washing method of removing deleterious deposits from calcined cation exchanged aluminosilicate zeolites, such deposits being formed by the precipitation of insoluble compounds of the exchange cations upon the molecular sieves during the exchange step.

The aluminosilicates are found both in nature in various forms and are prepared synthetically. However, the particular types of zeolites with which my invention is primarily concerned are commonly referred to as molecular sieves and more particularly have been designated as Type A, Type X, and Type Y molecular sieves by the Linde Division of the Union Carbide Corporation. The above types of zeolites are primarily distinguished from each other by having different silica to alumina ratios and pore sizes.

The crystalline zeolites, known as molecular sieves, are usually prepared synthetically in the sodium form by the reaction of concentrated sodium hydroxide solution, a source of silica, such as sodium silicate, for example, and an alumina source. Broadly speaking, the preparation of these zeolites comprises mixing the reactants together, aging the reaction mass for a predetermined period of time, followed by hydrothermal conversion steps, and then after the hydrothermal conversion is complete, washing the product to remove excess reactants. It is preferred that pH of the aqueous slurry of the washed product be reduced to about 9.5 to 11.

With the exception of a few adsorption applications in which the molecular sieve may be used in the sodium form, the major applications for the zeolitic materials require that the monovalent sodium cation be exchanged with divalent or trivalent cations. The required cation exchange, however, presents an additional problem in that the molecular sieves, regardless of the method of preparation, have an equilibrium pH in the order of 9.5 to 11, and this high pH causes a portion of the cation exchange elements to precipitate upon the sieve as hydroxides, basic oxonium salts, carbonates or other compounds rather than replacing the zeolitic sodium ion as intended. These precipitates undesirably tend to clog and obstruct the pore structure.

In uses of the exchanged sieve that do not require a temperature above the insipient fusion point, the alien precipitates have no deleterious effect other than blocking cage openings or causing unwanted side reactions in specific cases. This problem is, however, quite acute in the case of cracking operations or similar hydrocarbon applications. The cationic elements, such as the rare earths, that are not volatile nor electrically neutralized by the sieve force field will under deactivation temperature attack the silica components of the sieve destroying the structure. The more basic the element the more destruction and the lower the temperature in which this destruction occurs.

The precipitation is unavoidable because the equilibrium pH of the molecular sieves in the sodium form is about 10–11 while the pH required to stabilize the exchange salt cations in solution and to prevent hydrolysis precipitation is considerably below pH 10.0 and in some cases is strongly acidic. Thus some hydrolysis precipitation of the exchange cations must occur.

A good example of this problem is found with the mixed rare earth chloride exchange system. The product currently available on the market as "mixed rare earth chlorides" used to form the cation exchange solutions contains cerium, lanthanum and other rare earths. The oxychloride or hydroxide cerium may be formed at pH's as low as pH 3. Lanthanum, another component of these mixed rare earth products, is not fully precipitated until pH 9. Also a small portion of these and the other rare earth chlorides will form gelatinous hydrated nonexchangeable forms in the solutions having a pH of 3 to 9.

The various side reactions occurring during a rare earth cation exchange may be further considered by reference to the figure which illustrates the change in pH of the surface of a zeolite during the cation exchange of a Type X sodium zeolite with a rare earth salt exchange solution. In one instance the exchange solution was prepared from a rare earth salts mixture containing 97%, by weight, La salts (essentially chlorides) and in the second instance the rare earth salts mixture contained 97%, by weight, Ce salts (essentially chlorides). As may be seen from the figure as more grams of rare earth are exchanged into the zeolite, replacing sodium, the pH of the zeolite decreases from an initial equilibrium zeolite pH of about 10.6 to a final pH which is a function of the amount of cation exchange. The problem with which I am concerned exists because in the pH range at and above 9.0 the rare earth salts precipitate out according to the equation

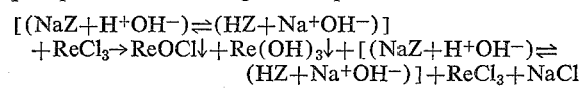

NaZ representing the sodium form of the zeolite,
HZ representing the hydrogen form of the zeolite, and
Re representing rare earths.

Further in the pH range below 9 to about 4 a portion of the rare earth salts will form a gelatinous gel, which will also coat and clog the zeolite, according to the equation

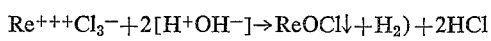

It should also be remembered in considering these equations that they are illustrative of a qualitative relationship and in view of the various complexes formed are not inclusive nor stoichiometrically accurate. Further it must be remembered that simultaneous with the above side reactions the primary reaction of cation exchange between the zeolitic sodium ion and rare earth cations is occurring.

The molecular sieves are normally exchanged with rare earth chloride solution by preparing the rare earth chloride solution which, after it is prepared, has a pH of 4 to 5. The molecular sieve in the sodium form, which has an equilibrium pH of 10.5 or over, is immersed in the rare earth chloride solution. The incremental sodium hydroxide equivalent of the molecular sieve precipitates or converts some of the rare earth cations to nonexchangeable hydroxy compounds which will stay with the molecular sieves as alien substances. Also since the cation exchanges require a concentration gradient to displace the Na content of the sieves, the longer process time elapsing after exchange equilibrium completion that the excess cations remain in the high pH environment the greater the amount of this contamination.

I have found that this problem can be solved and that precipitated hydroxides, etc., can be removed after calcination by washing the calcined divalent and trivalent cationically exchanged molecular sieves with a buffered acid solution. By buffered acid I do not mean limited to buffered acid solutions in the literal sense of a solution comprising an acid and buffering agent, usually a salt of a weak acid and strong base, but rather I am referring to a solution in which the pH is maintained within the desired pH range regardless of how this is accomplished. Thus a weak acid in the required concentration could be used or a salt of a strong acid and weak base in the required concentration. And also my process includes embodiments where additional acid or salt is added during the washing to replace the hydronium ions consumed in dissolving the precipitates and thus maintain the pH within the required range.

My process comprises washing the calcined water washed, cation exchanged sieve product with a buffered acidic solution having minimum pH of 3.5. This prevents the solution of alumina and consequent destruction of the molecular sieves. The solution at this pH contains sufficient acid to dissolve the extraneous cation compounds, but insufficient hydrogen ion concentration to dissolve the zeolite alumina which would destroy the molecular sieves or to exchange the sieve to the hydrogen form to any deleterious degree.

A further advantage of my process is that it permits recovery of the rare earth salts which may be concentrated, and if necessary converted to more desirable salts such as chlorides, and then recycled back to the initial cation exchange solutions. This represents a considerable advantage, especially in the production of catalysts, as the weight of rare earth cation per pound of catalyst is thus reduced without effecting any appreciable decrease in catalytic activity of the commercial catalyst.

Considering my process now in more detail, the actual preparation of the zeolite and initial cation exchange steps are not a part of my invention and may be effected by processes described in the prior art. For example, U.S. Patent 2,979,381 describes a process for preparing Type X molecular sieves comprising the following steps:

(1) Preparing a reactant mixture having a ratio of reactants in the desired range by adding all the raw materials to a mixed tank at one temperature.

(2) Allowing the resulting mixture to incorporate or digest at ambient temperature for at least about 3 hours.

(3) Heating the mixture to an elevated temperature.

(4) Maintaining the reactant mixture at the elevated temperature until the zeolite is crystallized.

The equilibrium or aging step is normally carried out at room temperature and the crystallization step at a temperature of about 212° F.

The slurry of the reactant mixture is filtered at a pH of above 12 and a temperature of 130 to 140° F. This material is transferred from the reaction vessel to the filtering apparatus. The transfer may be made with the slurry as recovered from the crystallization step or the slurry may be diluted with water. The slurry is dewatered and the cake washed to remove a portion of the sodium hydroxide and excess sodium silicate. The water used in this wash is then removed from the filter cake and the filter cake is washed to remove residual reactants. After washing the zeolite product is dried and if required subjected to other specialized treatments depending upon the desired use of the product.

The zeolite may be subjected to cation exchange by immersing the zeolite in a solution of the salts relied on to furnish the cations desired in the final product. The concentration of the salts depends, of course, on the particular cation being exchanged into the zeolite matrix. In the rare earth exchange, for example, the concentration of solution added depends on the composition of the rare earth chlorides. When the commercially available rare earth chlorides are used to prepare the exchange solution, the exchange solution has a pH of about 3 to 5.5 and contains about 5% to 25% rare earth chloride. The exchange is usually carried out at a temperature in the order of about 140 to 200° F. The exchange is preferably carried out at temperature of about 160° F. The exchange is normally carried out for periods of approximately ¼ to ½ hour with a period of about 30 minutes being preferred.

The actual ion exchange method used is not critical to my process and various modifications in exchange temperature, soaking times and exchange sequences (for example, where rare earth solutions having different compositions are used) may be used. Some of these modifications are illustrated in the examples but are not limited thereto.

After the ion example is complete, the slurry is filtered to recover the ion exchanged product. The product is then washed with water to remove entrained solution, and then dried by heating at about 250° F. The dried product is then calcined at a temperature of from 600° F. to 1200° F. for ½ to 3 hours. Obviously the drying and calcination steps may be combined.

The essence of my invention resides in a washing step following the calcination step whereby the above calcined product is washed with an acid solution carefully buffered to have a pH of 3.5 to 5.5. It is particularly critical that this pH range be used as a lower pH solution will attack the zeolite and a higher pH will not effect the desired dissolving of and washing away of the precipitated rare earth hydroxides, basic oxyonium salts and carbonates. Further, it is preferable that the pH be maintained within the range of from 3.5 to 4.5, as the washing effect is more efficient in the more acidic pH ranges. In effecting this step, a suitable buffered solution may be prepared by dissolving a salt known to effect at given concentration ranges the desired buffering action on the particular acid used. The particular acid and buffer salt combinations used are not critical so long as they maintain the proper pH range. Suitable acids which may be used, either in combination with a buffering agent or singly in very dilute concentrations, are hydrochloric acid, sulfuric acid and nitric acid, though this listing is, of course, not inclusive. Also, the buffered acid wash may comprise an acid salts which may be used either with the above listed acids or in sufficient concentration singly without an acid. One suitable salt is ammonium sulfate, though, of course, other salts may be used, for example, the chloride and acetate salts of ammonia.

The washing is then effected by slurrying the calcined exchanged zeolite with the buffered acid solution at a temperature of from 100° F. to 200° F. and preferably from 150° F. to 180° F. and then soaking the slurry for at least 5 minutes and preferably for 15 to 60 minutes. The zeolite is then filtered and washed again with another buffered acid solution, usually more dilute than the first solution (but still having a pH within the required range) but without soaking. This step prevents any chance of substantial rehydrolysis of the rare earth component and further assures removal of the rare earth deposits. The zeolite is then washed with water to remove any excess buffer or acid solution and then dried by heating at about 250° F. The zeolite may then be calcined again, if desired.

My invention is further illustrated by the following exemplary but nonlimiting examples.

EXAMPLE I

This example illustrates a conventional ion exchange treatment of the Type X synthetic zeolite with a rare earth ion exchange solution, followed by drying and calcination.

A rare earth ion exchange solution was prepared by dissolving 59.8 grams, expressed as the oxide, of mixed rare earths, the particular distribution of which is noted in the table, and water to form 600 milliliters of solution. 200 grams (dry basis) of Type X sodium zeolite was then added to the solution with constant mixing. The pH of the resulting slurry was 6.4. The temperature of the slurry was then raised to 160° F. and the slurry allowed to soak at this temperature for 30 minutes. The pH of the slurry, after this soaking, was observed to be 5.4. The slurry was then washed and the resulting ion exchanged zeolite was washed with water and then dried and calcined at 1000° F. for 3 hours. A sample of this product was then analyzed, the results of this analysis appear in the table.

EXAMPLE II

This example illustrates the washing step of my invention.

A buffered acid wash solution having a pH of 3.5 was prepared by dissolving 150 grams of ammonium sulfate in 1000 milliliters of water. 50 grams of the product produced in Example I was then mixed into the solution to form a slurry having a pH of 3.5 and allowed to soak for 15 minutes at 150° F. The pH of the slurry after standing was 4.4. The slurry was then filtered and the resulting filter cake was then given a first wash with 1000 milliliters of 10 percent ammonium sulfate (pH of 3.6) to prevent rehydrolysis of the rare earth constituents before removal from the now exchanged and washed sieve. The excess ammonium sulfate wash solution is then washed from the sieve with 3000 milliliters of water. The resulting product was then dried and then calcined for 3 hours at 1000° F. The calcined product was then analyzed, the results of this analysis appearing in the table.

EXAMPLE III

This example illustrates the preparation of another rare earth exchanged zeolite. In this example, 197 grams of Type X sodium zeolite was slurried in 500 milliliters of water (slurry pH 10.7). This slurry was then added with mixing to 350 milliliters of a didymium chloride solution containing 41.9 grams of rare earth expressed as the oxide and having a pH of 4.8. The resulting slurry was observed to have a pH of 6.7. The slurry was then allowed to stand for 16 hours at ambient temperature and then heated to 160° F. with stirring and then maintained at this temperature for 30 minutes. The pH of the slurry after standing 16 hours was observed to be 5.9 and after the 30 minute soaking at 160° F. was observed to be 5.2. The slurry was then filtered and the resulting filter cake washed with water, dried and calcined for 3 hours at 1000° F. Analysis of this product appears in the table.

EXAMPLE IV

This example illustrates the buffered acid washing method of my invention following the same procedure used in Example II but treating the product of Example III. The pH of the slurry after soaking was 4.6. Analysis of the product appears in the table.

EXAMPLE V

In this example, 83 grams of Type X sodium zeolite was slurried in 300 milliliters of water, the resulting slurry having a pH of 10.7. This slurry was then mixed with stirring into 75 milliliters of a didymium chloride solution containing 9 grams of rare earth oxide. The resulting slurry had a pH of 7.3. This slurry was then heated to 160° F. and allowed to soak at this temperature for 20 minutes. At the end of this soaking, the pH of the slurry was observed to be 6.9. A second rare earth oxide solution prepared by dissolving 14.7 grams (expressed as $Re_2O_3$) of commercial rare earth chloride crystals in 300 milliliters of water was then added to the above slurry with mixing and then allowed to soak at 160° F. for another 20 minutes. The pH of the slurry after soaking was observed to be 5.2. The slurry was then filtered and the resulting filter cake washed with water, dried and calcined for 3 hours at 1000° F.

EXAMPLE VI

This example illustrates another acid washing step according to my invention following the same procedure as set forth in Example II but washing the calcined product of Example V. The pH of the slurry after soaking was 4.0. Analysis of the resulting washed product appears in the table.

TABLE

|  | Example I | | Example III | | Example V | |
|---|---|---|---|---|---|---|
| $ReCl_3$ | 1%* Ce | | 1% Ce | | 35% Ce | |
| $G.ReCl_3 \cdot 6H_2O/g.\ 13X-Na$ | 0.65 | Percent Data Calculated as grams/gram $SiO_2-Al_2O_3$ | 0.45 | Percent Data Calculated as grams/gram $SiO_2-Al_2O_3$ | 0.60 | Percent Data Calculated as grams/gram $SiO_2-Al_2O_3$ |
| $Re_2O_3$ Distribution in $ReCl_3$: | | | | | | |
| $CeO_2$ | 0.7% | | 0.7% | | 31.95% | |
| $La_2O_3$ | 51.3% | | 51.3% | | 40.18% | |
| $Pr_6O_{11}$ | 10.1% | | 10.1% | | 6.85% | |
| $Nd_2O_3$ | 27.7% | | 27.7% | | 16.32% | |
| Others | 10.2% | | 10.2% | | 4.70% | |
| Calcined ReX Product: | | | | | | |
| $Na_2O$ | 6.60% | 0.091g | 6.60% | 0.089g | 5.54% | 0.077g |
| $SiO_2-Al_2O_3$ | 72.85% | 1.000g | 73.81% | 1.000g | 72.28% | 91.000g |
| $Re_2O_3$ | 20.55% | 0.282g | 19.59% | 0.265g | 22.18% | 0.307g |
| Re Distribution: | | | | | | |
| $CeO_2$ | 2.1% | 0.006g | 1.8% | 0.005g | 34.0% | 0.104g |
| $La_2O_3$ | 48.9% | 0.138g | 47.6% | 0.126g | 39.3% | 0.121g |
| $Pr_6O_{11}$ | 10.9% | 0.031g | 10.4% | 0.028g | 6.9% | 0.021g |
| $Nd_2O_3$ | 31.0% | 0.087g | 31.2% | 0.083g | 16.5% | 0.051g |
| $Y_2O_3$ | 1.5% | 0.004g | 2.1% | 0.006g | 0.6% | 0.002g |
| Other | 5.6% | 0.016g | 6.9% | 0.017g | 2.7% | 0.008g |
| Surface Area at 1,000° F., sq. m./gm. | 693 | | 687 | | 687 | |

|  | Example II | | Example IV | | Example VI | |
|---|---|---|---|---|---|---|
| Calcined Washed Product: | | | | | | |
| $Na_2O$ | 1.82% | 0.023g | 0.85% | 0.011g | 0.63% | 0.008g |
| $SiO_2-Al_2O_3$ | 77.98% | 1.000g | 80.35% | 1.000g | 77.74% | 1.000g |
| $Re_2O_3$ | 20.20% | 0.259g | 18.80% | 0.234g | 21.63% | 0.278g |
| Re Distribution: | | | | | | |
| $CeO_2$ | 1.8% | 0.005g | 1.6% | 0.004g | 36.2% | 0.101g |
| $La_2O_3$ | 53.0% | 0.137g | 51.1% | 0.120g | 40.5% | 0.113g |
| $Pr_6O_{11}$ | 11.9% | 0.031g | 11.2% | 0.026g | 6.4% | 0.018g |
| $Nd_2O_3$ | 29.2% | 0.076g | 29.3% | 0.069g | 14.8% | 0.041g |
| $Y_2O_3$ | 0.1% | | 1.8% | 0.004g | 0.4% | 0.001g |
| Other | 4.0% | 0.010g | 5.0% | 0.011g | 1.7% | 0.004g |
| X-ray Peak Height | 94 | | | | | |
| Surface Area at— | | | | | | |
| 1,000° F. | 709 | | 713 | | 732 | |
| 1,550° F. | 667 | | | | | |
| 1,600° F. | 598 | | 553 | | 592 | |
| Percent $Re_2O_3$ Removed by Washing | | 8.2% | | 11.7% | | 9.4% |

*All percentages are by weight.

As may be seen from the above table, my washing step results in about an 8 to 12 percent decrease of the total rare earth content of the calcined zeolite product. Since this percentage decrease is based upon the total rare earth content of the zeolite which includes the rare earth cations which have been exchanged to the zeolite crystal structure replacing sodium ions and which represents over 80 percent of the total rare earth content zeolite, it may be readily appreciated that my washing step is effected to remove at least a major portion of the undesirable precipitated rare earth oxides, etc. which are formed in the cation exchange step.

It is further apparent from an examination of the data collected in the table that the excess lanthanum and other excess rare earths can be removed by a buffered acid wash. Also a comparison of the surface area of the product after calcination at 1000° F., 1500° F. and 1600° F. shows that the removal of the lanthanum and other rare earths by the acid wash improves the stability of the product. Thus, for example, the washed product of Example II had a surface area of 709 after the 1000° F. calcination, 667 after the 1550° F. and 598 after the 1600° F. calcination as compared with the unwashed product of Example I which had a surface area of 693 square meters per gram after heating to 1000° F. and which would rapidly deteriorate further were it subjected to higher temperature calcination.

Obviously many modifications and variations of the invention may be made without departing from the essence and scope thereof and only such limitations should be applied as are indicated in the appended claims.

What is claimed is:

1. A process of buffered acid washing calcined cation exchanged aluminosilicate zeolites to substantially remove precipitated compounds of said cation, which comprises:
    (a) preparing a buffered acid solution having a pH in the range of 3.5 to 5.5,
    (b) slurrying said calcined zeolite with sufficient buffered acid solution such that the pH of the slurry is maintained between 3.5 and 5.5,
    (c) soaking the slurry for at least 5 minutes at a temperature of from 125 to 200° F. wherein said precipitates are dissolved,
    (d) filtering the slurry whereby a zeolite substantially free of said precipitated compounds is recovered,
    (e) washing the recovered zeolite with a dilute buffered acid solution to prevent any rehydrolysis of occluded cations and residual deposits, and filtering the zeolite,
    (f) washing the zeolite with water to remove excess buffered acid solution and filtering the zeolite, and
    (g) drying the zeolite.

2. The process of claim 1 wherein said cation is a rare earth metal cation.

3. The process of claim 1 wherein the buffered acid solution comprises an acid selected from the group consisting of hydrochloric acid, sulfuric acid and nitric acid.

4. The process of claim 2 wherein the rare earth cation precipitates dissolved in the wash solution are recovered after the filtration steps.

5. The process of claim 1 wherein the buffered acid solution comprises a salt selected from the group consisting of ammonium sulfate, ammonium acetate and ammonium chloride.

6. The process of claim 1 wherein the buffered acid solution comprises ammonium sulfate and sulfuric acid.

7. The process of claim 1 wherein the buffered acid solution has a pH in the range of 3.5 to 4.5.

References Cited

UNITED STATES PATENTS

| | | | |
|---|---|---|---|
| 1,978,889 | 10/1934 | Behrman | 23—113 |
| 2,979,381 | 4/1961 | Gottstine et al. | 23—113 |
| 3,130,006 | 4/1964 | Rabo et al. | 252—455 |

SAMIH N. ZAHARNA, Primary Examiner

U.S. Cl. X.R.

252—455